G. W. & J. J. KERSEY.
Potato-Planter.
No. 30,144.                                                                 Patented Sept. 25, 1860.
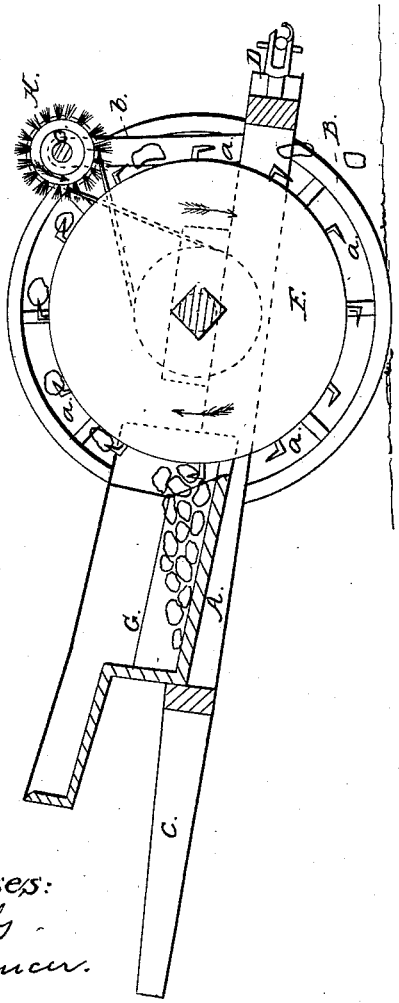
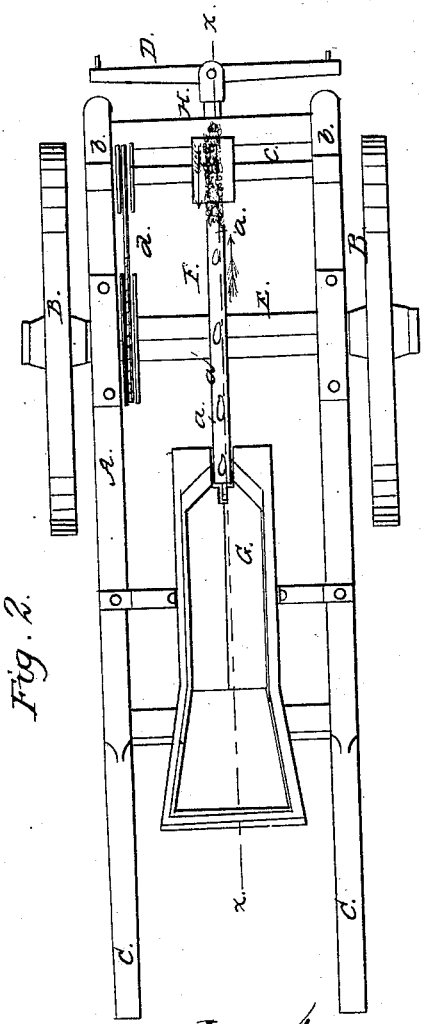
Witnesses:
Inventors:

UNITED STATES PATENT OFFICE.

GEO. W. KERSEY AND JNO. J. KERSEY, OF BEARTOWN, PENNSYLVANIA.

IMPROVEMENT IN POTATO-PLANTERS.

Specification forming part of Letters Patent No. 30,144, dated September 25, 1860.

*To all whom it may concern:*

Be it known that we, GEORGE W. KERSEY and JOHN J. KERSEY, both of Beartown, in the county of Lancaster and State of Pennsylvania, have invented a new and Improved Machine for Planting Potatoes; and we do hereby declare that the following is a full, clear, and exact description of the same, reference being had to the annexed drawings, making a part of this specification, in which—

Figure 1 is a side sectional view of our invention, taken in the line $x\ x$, Fig. 2; Fig. 2, a plan or top view of the same.

Similar letters of reference indicate corresponding parts in the two figures.

This invention consists in the employment or use of a rotary disk armed with hooks at its periphery, which pass through a slot in a hopper, and using in connection with said disk a rotary stripping-brush, the above parts being placed on a mounted frame, and so arranged in relation with each other that as the machine is drawn along the hooks on the rotating disk will take the potatoes from the hopper, while the stripping-brush will disengage them from the hooks at the proper point, so that they may drop into the furrow or drill.

To enable those skilled in the art to fully understand and construct our invention, we will proceed to describe it.

A represents a frame of rectangular or approximate form, which is supported at its front by wheels B B, the back part of the frame terminating in handles C C. To the front end of the frame A there is secured a whiffletree, D, to which the draft-animal is attached. On the axle E of the wheels B B there is placed a circular disk, F, into the periphery of which hooks $a$ are driven, and the back part of the disk F works in a slot in the front end of a hopper, G, which is secured on the back part of the frame A. On the front part of the frame A there are placed two uprights, $b\ b$, between the upper parts of which there is placed a shaft, $c$, said shaft having a brush-wheel, H, upon it. This brush-wheel is driven from the axle E by a belt, $d$, and the periphery of the wheel H runs with greater velocity than the periphery of the disk F. The direction of rotation of both the disk and the brush-wheel is shown by the arrows in Fig. 1.

The hopper G has the potatoes which are to be planted placed in it, and as the machine is drawn along the handles C C are held by the attendant. The hooks $a$, as the disk F rotates, catch each a potato (or piece of one, if they are cut) and carry them out of the hopper G, and as the potatoes or pieces descend at the front side of the disk F the brush-wheel H strips the potatoes from the hooks and the former drop into the drills or furrows prepared to receive them.

The frame A may be provided with a furrow-share in front and two covering-shares behind, so that the furrows may be made and the potatoes covered as they are dropped; or, if desired, the furrows may be made previously and the potatoes covered by hand after being planted by the machine. The former method, however, would be preferable.

Having thus described our invention, what we claim as new, and desire to secure by Letters Patent, is—

The rotating disk F, armed with hooks $a$, in connection with the hopper G and rotating brush-wheel H, the above parts being placed on a mounted frame, A, and arranged relatively with each other, to operate as and for the purpose set forth.

GEORGE W. KERSEY.
JOHN J. KERSEY.

Witnesses:
JNO. E. VALENTIN,
M. J. VALENTIN.